United States Patent
Choi

(10) Patent No.: US 9,840,249 B2
(45) Date of Patent: Dec. 12, 2017

(54) CONTROL METHOD FOR CLUTCH OF HYBRID ELECTRIC VEHICLE

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 98 days.

(21) Appl. No.: 14/821,296

(22) Filed: Aug. 7, 2015

(65) Prior Publication Data

US 2016/0114782 A1   Apr. 28, 2016

(30) Foreign Application Priority Data

Oct. 28, 2014   (KR) .................. 10-2014-0147703

(51) Int. Cl.
*B60W 10/02*   (2006.01)
*F16D 48/06*   (2006.01)
(Continued)

(52) U.S. Cl.
CPC ............. *B60W 20/10* (2013.01); *B60K 6/365* (2013.01); *B60K 6/387* (2013.01); *B60K 6/442* (2013.01); *B60K 6/547* (2013.01); *B60W 10/02* (2013.01); *B60W 10/06* (2013.01); *B60W 10/08* (2013.01); *F16D 48/06* (2013.01); *B60W 2050/0087* (2013.01); *B60W 2050/0088* (2013.01);
(Continued)

(58) Field of Classification Search
CPC ...... B60W 20/10; B60W 10/06; B60W 10/08; B60W 10/02; B60W 2710/022; B60W 2510/0241; B60W 2050/0088; F16D 48/06; B60K 6/547; B60K 6/442; B60K 6/365; B60K 6/387; Y02T 10/6234; Y02T 10/6286
See application file for complete search history.

(56) References Cited

U.S. PATENT DOCUMENTS 4,653,816 A * 3/1987 Lin ........................ B60T 8/58
303/175
4,673,225 A * 6/1987 Kade ................. B60T 8/17636
303/162

(Continued)

FOREIGN PATENT DOCUMENTS

JP   2000-71815 A   3/2000
JP   2011-20570 A   2/2011
(Continued)

*Primary Examiner* — Frederick Brushaber
(74) *Attorney, Agent, or Firm* — Morgan, Lewis & Bockius LLP

(57) ABSTRACT

A control method for a clutch of a hybrid electric vehicle including a series and parallel type of hybrid transmission, may include determining whether the hybrid electric vehicle may be operating as the parallel type, determining a hydraulic pressure of the clutch according to a demand torque of a driver when the hybrid electric vehicle may be operating as the parallel type, determining a target value of torque blending which blends a front side torque of the clutch with a motor torque and performing the torque blending, increasing the target value of the torque blending until a clutch slip may be generated, stopping the torque blending when the clutch slip may be generated, and learning a hydraulic pressure of the clutch corresponding to the front side torque of the clutch at a time when the clutch slip may be generated.

5 Claims, 3 Drawing Sheets

(51) Int. Cl.
  *B60K 6/365*  (2007.10)
  *B60W 10/08*  (2006.01)
  *B60W 20/10*  (2016.01)
  *B60K 6/387*  (2007.10)
  *B60W 10/06*  (2006.01)
  *B60K 6/442*  (2007.10)
  *B60K 6/547*  (2007.10)
  *B60W 50/00*  (2006.01)

(52) U.S. Cl.
  CPC ............... *B60W 2510/0241* (2013.01); *B60W 2710/022* (2013.01); *Y02T 10/6234* (2013.01); *Y02T 10/6286* (2013.01); *Y10S 903/946* (2013.01)

(56) References Cited

U.S. PATENT DOCUMENTS

| | | | | |
|---|---|---|---|---|
| 4,750,124 A * | 6/1988 | Lin | ............... | B60T 8/17636 303/162 |
| 4,755,946 A * | 7/1988 | Lin | ............... | B60T 8/17636 303/162 |
| 4,761,741 A * | 8/1988 | Agarwal | ............. | B60T 8/17636 180/197 |
| 4,828,334 A * | 5/1989 | Salman | ................. | B60T 8/1766 303/112 |
| 6,840,341 B2 | 1/2005 | Fujikawa | | |
| 7,286,922 B1 * | 10/2007 | Fischer | ................ | F16H 61/143 192/54.1 |
| 7,610,976 B2 * | 11/2009 | Holmes | ................. | B60K 6/445 180/65.265 |
| 7,678,013 B2 * | 3/2010 | Soliman | ................... | B60K 6/52 180/65.265 |
| 7,691,027 B2 * | 4/2010 | Soliman | ......... | B60W 30/18072 477/5 |
| 7,784,575 B2 * | 8/2010 | Yamanaka | ............... | B60K 6/48 180/65.265 |
| 8,352,136 B2 * | 1/2013 | Saito | ..................... | B60K 10/02 477/5 |
| 9,005,077 B2 * | 4/2015 | Kim | ........................ | B60K 6/52 180/65.28 |
| 9,174,640 B2 * | 11/2015 | Dlugoss | ................. | B60W 20/40 |
| 2008/0305924 A1 * | 12/2008 | Soliman | ................. | B60K 6/445 477/5 |
| 2008/0305925 A1 * | 12/2008 | Soliman | ................. | B60K 6/445 477/5 |
| 2009/0118084 A1 * | 5/2009 | Heap | ...................... | B60K 6/365 477/5 |
| 2011/0254358 A1 * | 10/2011 | Strengert | .................. | B60T 1/10 303/3 |
| 2011/0295472 A1 * | 12/2011 | Webert | .................. | F16H 61/061 701/58 |
| 2012/0004797 A1 * | 1/2012 | Baino | ..................... | B60K 6/48 701/22 |
| 2012/0161507 A1 * | 6/2012 | Vollert | ..................... | B60T 8/32 303/114.1 |
| 2013/0238209 A1 * | 9/2013 | Schaefers | ............... | B60T 7/122 701/70 |
| 2015/0126329 A1 * | 5/2015 | Johri | ..................... | B60W 10/08 477/5 |

FOREIGN PATENT DOCUMENTS

| | | |
|---|---|---|
| KR | 10-1028014 B1 | 4/2011 |
| KR | 10-2013-0136779 A | 12/2013 |
| KR | 10-2014-0079157 A | 6/2014 |
| KR | 10-2014-0144406 A | 12/2014 |

* cited by examiner

CONTROL METHOD FOR CLUTCH OF HYBRID ELECTRIC VEHICLE

CROSS-REFERENCE TO RELATED APPLICATION

The present application claims priority to and the benefit of Korean Patent Application No. 10-2014-0147703 filed on Oct. 28, 2014, the entire contents of which is incorporated herein for all purposes by this reference.

BACKGROUND OF THE INVENTION

Field of the Invention

The present invention relates to a control method for a clutch of a hybrid electric vehicle. More particularly, the present invention relates to a control method for a clutch of a hybrid electric vehicle that can minimize an operation hydraulic pressure of the clutch by controlling a transfer torque of the clutch in a series and parallel type of hybrid transmission.

Description of Related Art

A hybrid vehicle is a vehicle using two or more different kinds of power sources, and is generally a vehicle that is driven by an engine that obtains a driving torque by burning fuel and a motor that obtains a driving torque from battery power.

A hybrid vehicle may be formed in various structures using an engine and an electric motor as a power source, and a vehicle using an electric motor that directly transfers mechanical power of the engine to a wheel and that is driven with power of a battery as needed is referred to as a parallel hybrid vehicle, and a vehicle that drives an electric motor or that charges electric power to a battery by converting mechanical power of an engine to electrical power through a generator is referred to as a series hybrid vehicle.

Among these hybrid electric vehicles, a hybrid electric vehicle provided with a series and parallel type of hybrid transmission can be operated variably as a series type only using a motor or a parallel type simultaneously using an engine and a motor with a clutch.

The clutch of the series and parallel type hybrid transmission is operated by a hydraulic pressure when the hybrid electric vehicle is operated as a parallel type. Thus, an available transfer torque of the clutch is changed by adjusting the hydraulic pressure depending on a value of a driving torque of the hybrid electric vehicle.

Therefore, available transfer torque of the clutch depending on the hydraulic pressure should be controlled in order to improve efficiency of the series and parallel type of hybrid transmission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method for a clutch of a hybrid electric vehicle having advantages of minimizing an operation hydraulic pressure of the clutch by controlling a transfer torque of the clutch in a series and parallel type of hybrid transmission.

An aspect of the present invention provides a control method for a clutch of a hybrid electric vehicle which may include a series and parallel type of hybrid transmission that may include determining whether the hybrid electric vehicle is operating as a parallel type, calculating a hydraulic pressure of a clutch according to a demand torque of a driver when the hybrid electric vehicle is operating as the parallel type, calculating a target value of torque blending which blends a front side torque of the clutch with a motor torque and performing the torque blending, increasing the target value of torque blending until a clutch slip is generated, stopping the torque blending when the clutch slip is generated, and learning a hydraulic pressure of the clutch corresponding to the front side torque of the clutch at a time when the clutch slip is generated.

The control method may further include controlling the clutch with the learned hydraulic pressure after learning the hydraulic pressure of the clutch corresponding to the front side torque of the clutch at the time when the clutch slip is generated.

The performing the torque blending may increase the front side torque of the clutch and the motor torque while maintaining a wheel torque.

The performing the torque blending may include, comparing the front side torque of the clutch with an available transfer torque of the clutch, calculating a hydraulic pressure of the clutch corresponding to the front side torque of the clutch when the front side torque of the clutch is greater than the available transfer torque of the clutch, and applying the hydraulic pressure of the clutch, and performing the torque blending when the hydraulic pressure of the clutch is applied.

The control method may further include outputting the motor torque to satisfy the demand torque of the driver after applying the hydraulic pressure of the clutch.

The increasing the target value of torque blending until the clutch slip is generated may be maintained when a torque blending value is smaller than or equal to a predetermined value.

The learning the hydraulic pressure of the clutch corresponding to the front side torque of the clutch when the clutch slip is generated may store the hydraulic pressure of the clutch corresponding to the front side torque of the clutch as a value of the available transfer torque of the clutch.

Another aspect of the present invention provides a control method for a clutch of a hybrid electric vehicle including a series and parallel type hybrid transmission that may include determining whether the hybrid electric vehicle is operating as a parallel type, comparing a front side torque of the clutch with an available transfer torque of the clutch when the hybrid electric vehicle is operating as the parallel type, calculating a hydraulic pressure of the clutch corresponding to the front side torque of the clutch when the front side torque of the clutch is greater than the available transfer torque of the clutch, and applying the hydraulic pressure of the clutch, and performing a torque blending when the hydraulic pressure of the clutch is applied.

The control method may further include outputting the motor torque to satisfy the demand torque of the driver after applying the hydraulic pressure of the clutch.

As described above, according to an aspect of the present invention, an available transfer torque of the clutch depending on the hydraulic pressure of the clutch can be learned, so an operation hydraulic pressure of the clutch can be minimized and efficiency of the transmission can be improved.

In addition, the motor torque is outputted when the hydraulic pressure of the clutch is applied, so responsiveness due to hydraulic pressure increase delay can be prevented from being deteriorated.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
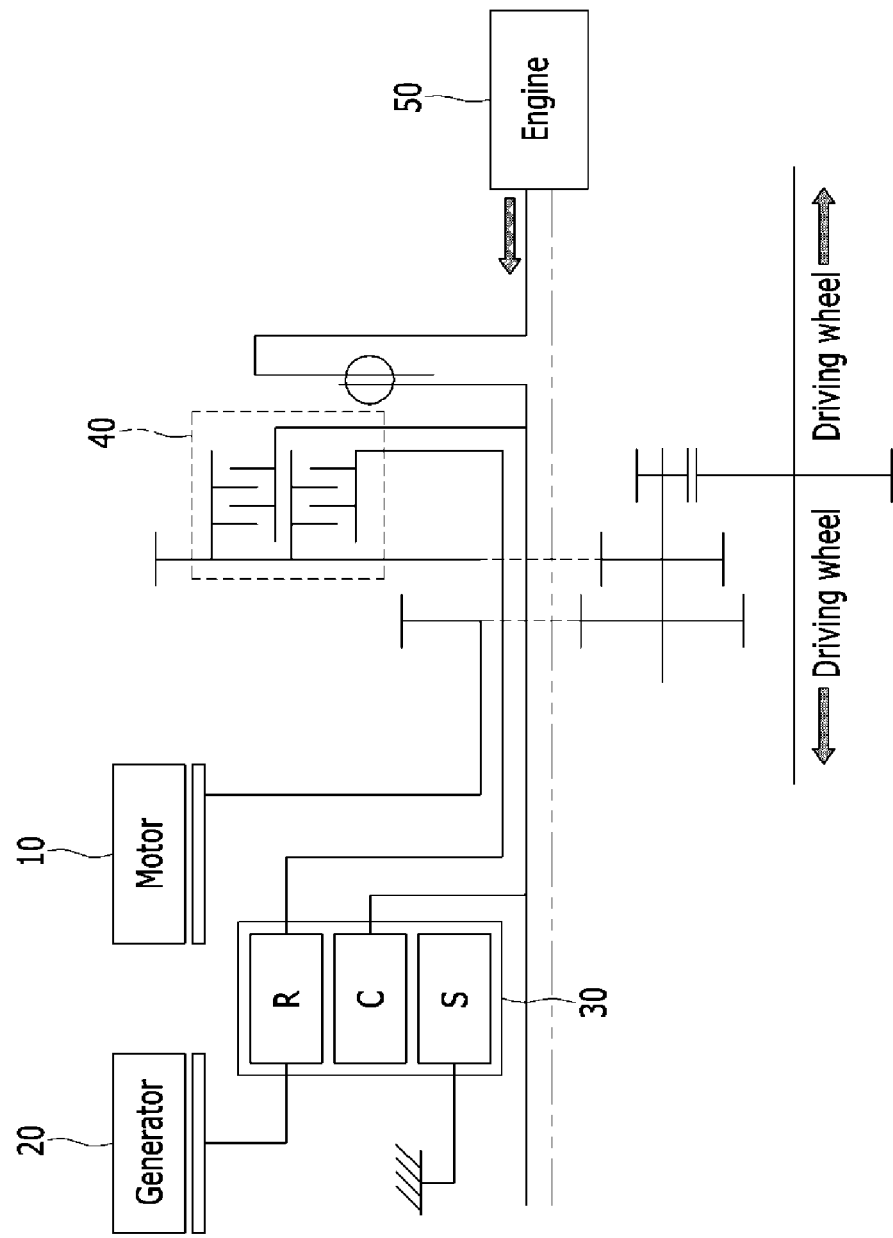
FIG. 1 is a schematic diagram illustrating configuration of a series and parallel type of hybrid transmission to which an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout this specification and the claims which follow, unless explicitly described to the contrary, the word "comprise" and variations such as "comprises" or "comprising" will be understood to imply the inclusion of stated elements but not the exclusion of any other elements.

Description of components that are not necessary for explaining the present exemplary embodiment will be omitted, and the same constituent elements are denoted by the same reference numerals in this specification.

An exemplary embodiment of the present invention will hereinafter be described in detail with reference to the accompanying drawings.

FIG. 1 is a schematic diagram illustrating configuration of a series and parallel type hybrid transmission to which an exemplary embodiment of the present invention is applied.

Referring to FIG. 1, a system including a series and parallel type of hybrid transmission to which a control method for a clutch of a hybrid electric vehicle according to an exemplary embodiment of the present invention is applied includes an engine 50, a motor 10, and a generator 20 as power sources. The system changes torque of the engine 50 transmitted through an input shaft and torques of the motor 10 and the generator 20 according to a running state of the hybrid electric vehicle and outputs the changed torque through an output gear.

The motor 10 and the generator 20 are independent power sources, so the power sources are called the motor 10 and the generator 20 for convenience of description in this specification, but they are not limited thereto. That is, the motor 10 and the generator 20 are configured as a first motor/generator and a second motor/generator.

The generator 20 may be connected to the engine 50 through a planetary gear set 30. The planetary gear set 30 includes a ring gear R, a carrier C, and a sun gear S. That is, the generator 20 may be directly connected to the ring gear R, and may be operated as a motor or a generator to rotate the ring gear R.

A clutch 40 is mounted on the input shaft of the engine 50. Therefore, the hybrid electric vehicle may be driven as a series type when the clutch 40 is released, and may be driven as a parallel type when the clutch 40 is engaged.

The clutch 40 may include a 1:1 clutch and an OD clutch. That is, the clutch 40 is selectively connected to the planetary gear set 30, so the input shaft of the engine 50 may be connected to a driving wheel through the 1:1 clutch or the OD clutch.

Hereinafter, a control method for the clutch 40 according to an exemplary embodiment of the present invention will be described in detail with reference to FIG. 2 and FIG. 3.

Figure 2:
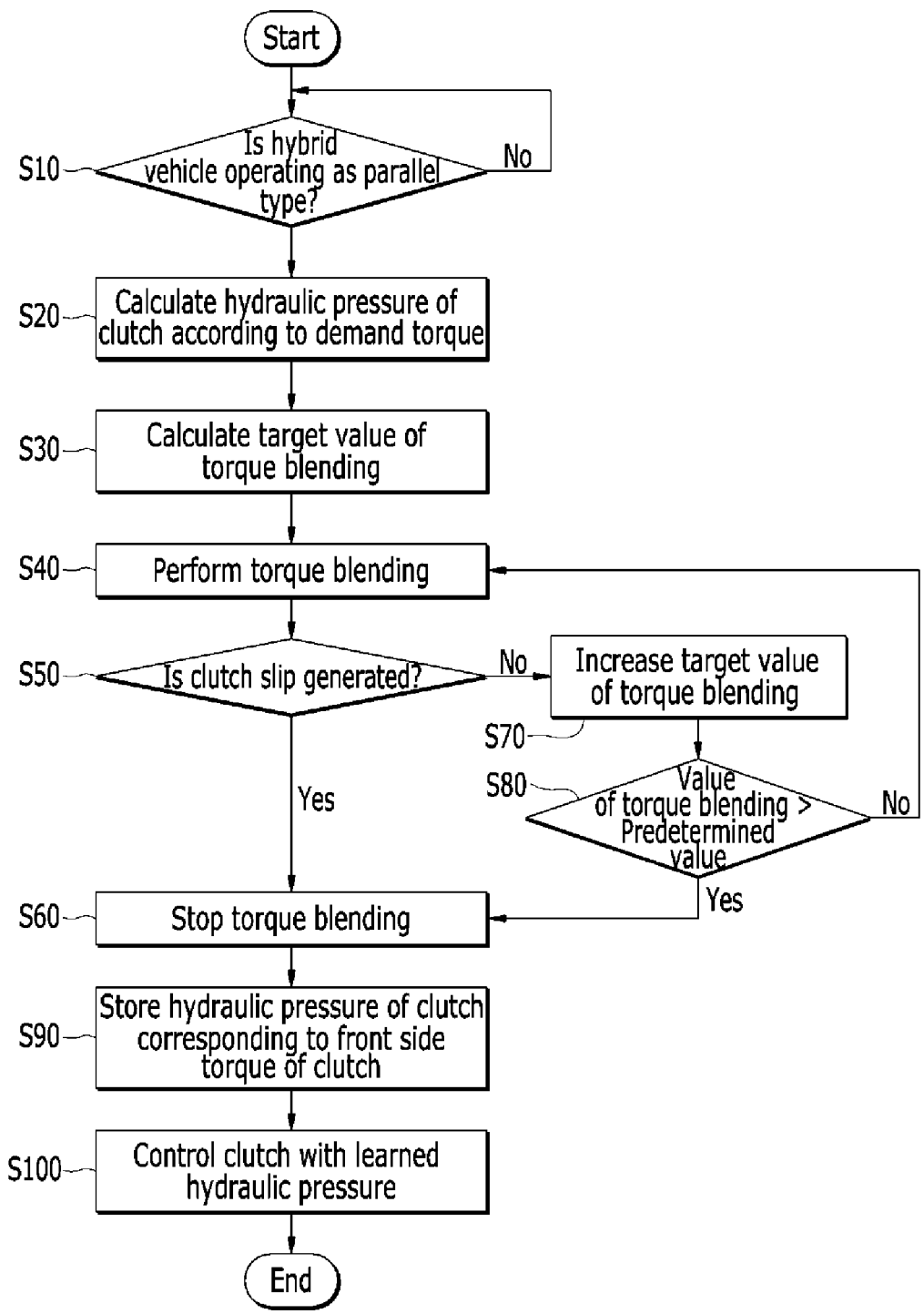
FIG. 2 is a flowchart illustrating a control method for a clutch of a hybrid electric vehicle according to an exemplary embodiment of the present invention.

FIG. 2 is a flowchart illustrating a control method for a clutch of a hybrid electric vehicle according to an exemplary embodiment of the present invention.

As shown in FIG. 2, a control method for a clutch of a hybrid electric vehicle according to an exemplary embodiment of the present invention starts with determining whether the hybrid electric vehicle is operating as a parallel type by a controller at step S10.

Whether the hybrid electric vehicle is operating as the parallel type may be determined on the basis of a demand torque of a driver, a vehicle speed, a battery SOC, and so on.

Unless the hybrid electric vehicle is operating as the parallel type at the step S10, the controller finishes a control method for a clutch of a hybrid electric vehicle according to an exemplary embodiment of the present invention.

When the hybrid electric vehicle is operating as the parallel type at the step S10, the controller calculates a hydraulic pressure of the clutch according to a demand torque of a driver at step S20.

The demand torque of the driver may be calculated on the basis of a vehicle speed and a position value of an accelerator pedal. If the demand torque of the driver is calculated, the controller may calculate output torques of the engine 50, the generator 20, and the motor 10. From among these, a sum of the engine output torque and the generator output torque is an input torque of front side of the clutch, and the controller may calculate hydraulic pressure of the clutch to satisfy the input torque of front side of the clutch.

When the hydraulic pressure of the clutch according to the demand torque of the driver is calculated at the step S20, the controller calculates a target value of torque blending which blends a front side torque of the clutch with a motor torque at step S30.

The torque blending blends the front side torque of the clutch which is a sum of the engine output torque and the generator output torque with the motor torque and adjusts the front side torque of the clutch and the motor torque to maintain a torque transmitted through the clutch 40. That is, the torque blending may adjust the front side torque of the clutch and the motor torque with a constant value of a wheel torque.

The target value of torque blending means a sum of the front side torque of the clutch and the motor torque at a time when the clutch 40 slips. For example, if the front side torque of the clutch is 100 Nm, the motor torque is 0 Nm, and the target value of torque blending is 110 Nm, the controller increase the front side torque of the clutch and increases the motor torque in an opposite direction. That is, the front side torque of the clutch is increased by 110 Nm and the motor torque is increased by −10 Nm, so the wheel torque is maintained as 100 Nm, while force applied to the clutch which is the front side torque of the clutch may be increased by 110 Nm.

If the target value of torque blending is calculated at the step S30, the controller performs the torque blending at step S40.

The torque blending is performed at the step S40, and the controller determines whether a clutch slip is generated at step S50.

The clutch slip may be generated when a speed of the generator 20 is abnormally increased or decreased.

When the clutch slip is generated at the step S50, the controller stops the torque blending at step S60, and learns a hydraulic pressure of the clutch corresponding to the front side torque of the clutch when the clutch slip is generated at step S90.

The front side torque of the clutch when the clutch slip is generated may be a maximum torque that the clutch 40 can transmit with a corresponding hydraulic pressure of the clutch. Therefore, the controller may store a value of the hydraulic pressure of the clutch corresponding to the front side torque of the clutch when the clutch slip is generated.

Contrary to this, if the clutch slip is not generated at the step S50, the controller increases the target value of torque blending at step S70.

After increasing the target value of torque blending at the step S70, the controller determines whether a value of torque blending is greater than a predetermined value at step S80.

If the value of torque blending is smaller than or equal to the predetermined value at the step S80, the process returns to the step S40 that performs the torque blending, and on the contrary, if the value of torque blending is greater than the predetermined value, the process proceeds to the step S60 that stops the torque blending.

If the torque blending is continually performed at the step S40 since the target value of torque blending is increased at the step S70, the front side torque of the clutch may be increased more and more. For example, if the front side torque of the clutch is 110 Nm, the motor torque is −10 Nm, and the target value of torque blending is increased by 120 Nm from 110 Nm, the motor torque may be increased by −20 Nm such that the front side torque of the clutch may be increased by 120 Nm.

Meanwhile, the front side torque of the clutch is gradually increased by performing the torque blending such that a torque transmitted to the driving wheel may be sharply decreased when the clutch slip is generated because the front side torque of the clutch is excessively greater than an available transfer torque of the clutch corresponding to the hydraulic pressure of the clutch. Thus, a shock of the vehicle may be generated. In order to prevent the shock of the vehicle according to the clutch slip, the controller stops the torque blending when the value of the torque blending is greater than the predetermined value.

After that, the controller stores the hydraulic pressure of the clutch corresponding to the front side torque of the clutch at the time when the clutch slip is generated at step S90, and controls the clutch 40 with the learned hydraulic pressure at step S100.

However, according to an exemplary embodiment of the present invention, the clutch 40 can be controlled by a minimal hydraulic pressure such that the front side torque of the clutch may be changed and the clutch slip may be generated. Therefore, the controller may perform the torque blending as shown in FIG. 3 in order to prevent the clutch slip.

Figure 3:
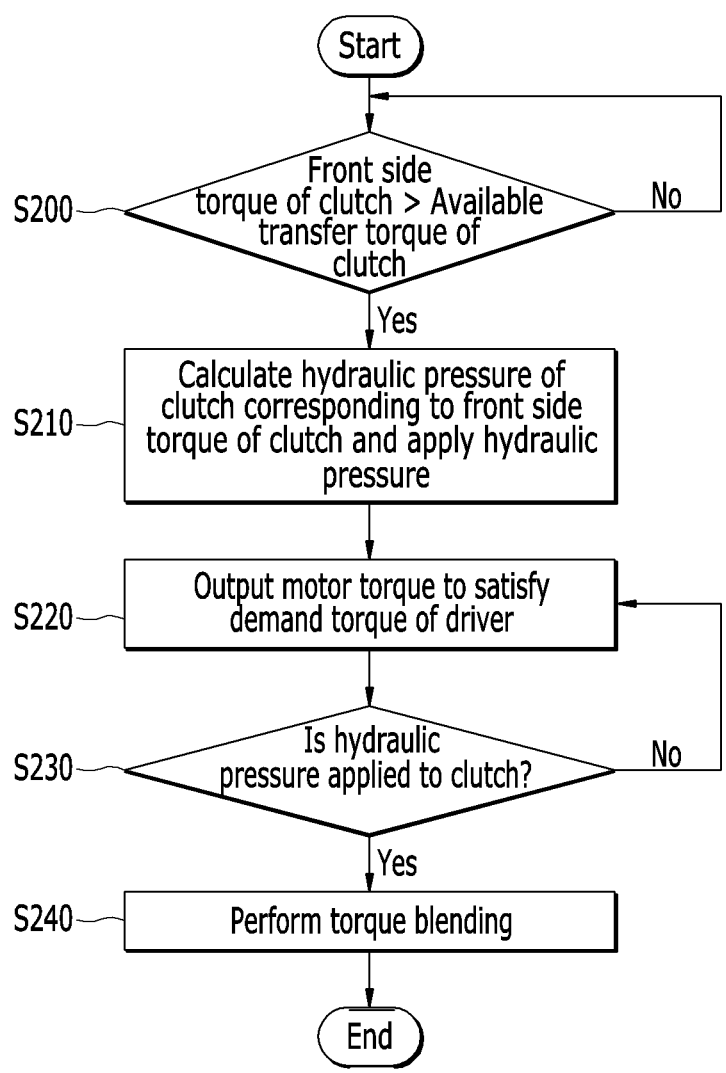
FIG. 3 is a flowchart illustrating partial steps of a control method for a clutch of a hybrid electric vehicle in detail according to an exemplary embodiment of the present invention.

FIG. 3 is a flowchart illustrating partial steps of a control method for a clutch of a hybrid electric vehicle in detail according to an exemplary embodiment of the present invention.

As shown in FIG. 3, the controller compares the front side torque of the clutch with the available transfer torque of the clutch to perform the torque blending at step S200.

When the front side torque of the clutch is greater than the available transfer torque of the clutch at the step S200, the controller calculates the hydraulic pressure of the clutch corresponding to the front side torque of the clutch, and applies the calculated hydraulic pressure to the clutch 40 at step S210.

The clutch slip may be easily generated if the front side torque of the clutch is greater than the available transfer torque of the clutch. Therefore, the controller may increase the available transfer torque of the clutch by increasing the hydraulic pressure of the clutch so as to prevent the clutch slip.

However, a timing difference of applying the hydraulic pressure to the clutch 40 may be generated. At this time, a driving torque of the vehicle cannot be increased until the hydraulic pressure is applied to the clutch 40 as the demand torque of the driver is increased, so responsiveness of the vehicle may be slowed.

Therefore, in order to improve the responsiveness of the vehicle, the controller outputs a motor torque to satisfy the demand torque of the driver by controlling the motor 10 at step S220.

After that, the controller determines whether the hydraulic pressure is applied to the clutch 40 at step S230. Whether the hydraulic pressure is applied to the clutch 40 may be determined by comparing the hydraulic pressure with a predetermined value or receiving a signal from a hydraulic pressure sensor.

When the hydraulic pressure is applied to the clutch 40 at the step S230, the controller performs the torque blending at step S240.

The controller may increase the front side torque of the clutch and decrease the motor torque outputted at the step S220 by performing the torque blending.

As described above, according to an exemplary embodiment of the present invention, responsiveness due to hydraulic pressure increase delay can be prevented from being deteriorated.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a clutch of a hybrid electric vehicle including a series and parallel type of a hybrid transmission, comprising:
   determining whether the hybrid electric vehicle is operating as the parallel type;
   determining a hydraulic pressure of the clutch according to a demand torque of a driver when the hybrid electric vehicle is operating as the parallel type;
   determining a target value of torque blending which blends a front side torque of the clutch with a motor torque and performing the torque blending, wherein the front side torque is a summation of an engine output torque and a generator input torque;
   increasing the target value of the torque blending until a clutch slip is generated;
   stopping the torque blending when the clutch slip is generated; and
   learning a hydraulic pressure of the clutch corresponding to the front side torque of the clutch at a time when the clutch slip is generated,
   wherein the performing the torque blending comprises:
      comparing the front side torque of the clutch with an available transfer torque of the clutch;
      determining a hydraulic pressure of the clutch corresponding to the front side torque of the clutch when the front side torque of the clutch is greater than the available transfer torque of the clutch, and applying the determined hydraulic pressure of the clutch; and
      performing the torque blending when the determined hydraulic pressure of the clutch is applied, and
   wherein the learning the hydraulic pressure of the clutch corresponding to the front side torque of the clutch when the clutch slip is generated stores the hydraulic pressure of the clutch corresponding to the front side torque of the clutch as a value of the available transfer torque of the clutch.

2. The control method of claim 1, further comprising controlling the clutch with the learned hydraulic pressure after learning the hydraulic pressure of the clutch corresponding to the front side torque of the clutch at the time when the clutch slip is generated.

3. The control method of claim 1, wherein the performing the torque blending increases the front side torque of the clutch and the motor torque while maintaining a wheel torque.

4. The control method of claim 1, further comprising:
   outputting the motor torque to satisfy the demand torque of the driver after applying the determined hydraulic pressure of the clutch.

5. The control method of claim 1, wherein the increasing the target value of torque blending until the clutch slip is generated is maintained when a torque blending value is smaller than or equal to a predetermined value.

* * * * *